June 26, 1951
R. SIMPSON ET AL
2,558,276
MULTIPLE SCALES FOR ELECTRICAL MEASURING INSTRUMENTS
Filed May 29, 1948
2 Sheets-Sheet 1
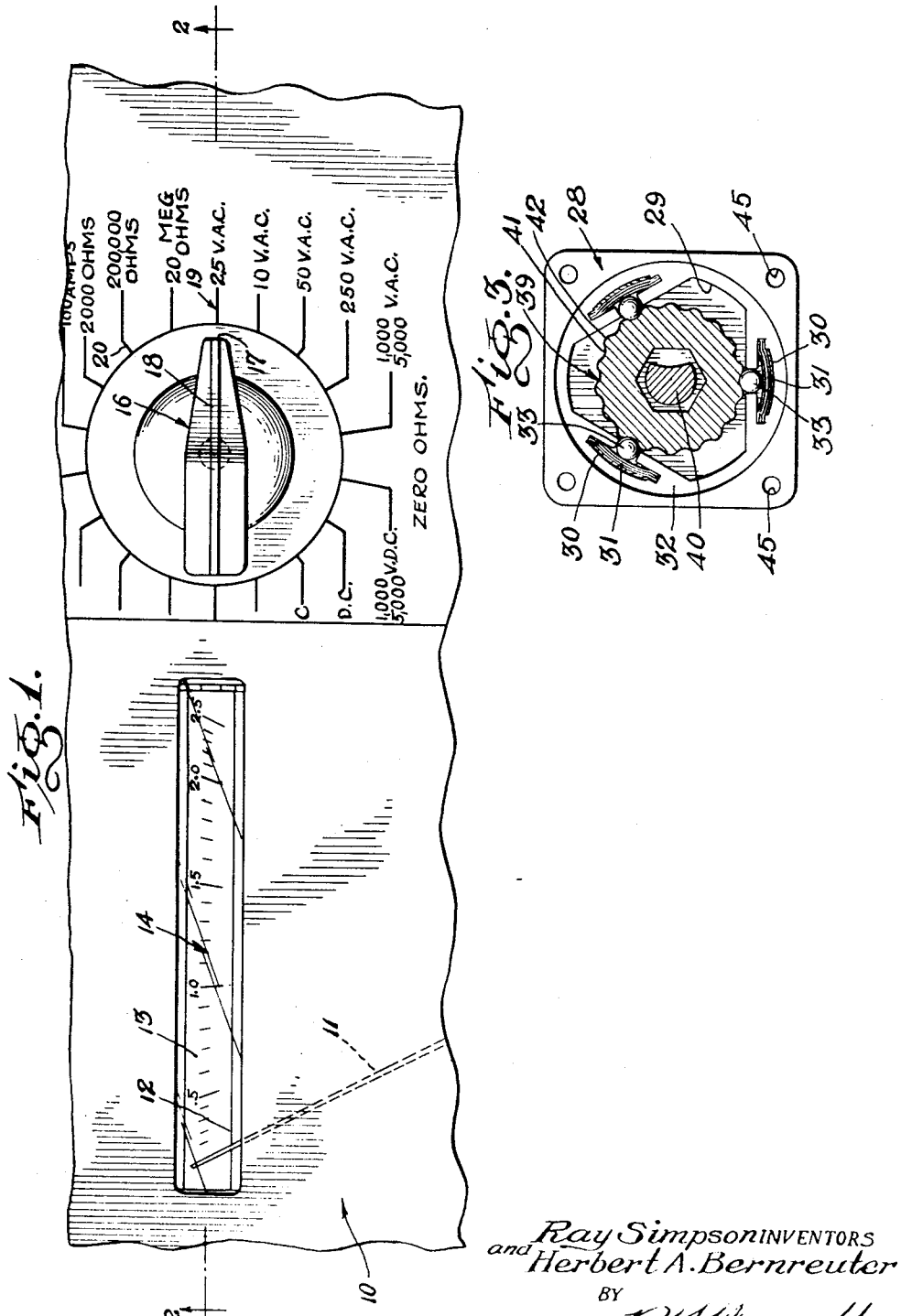
Ray Simpson and Herbert A. Bernreuter INVENTORS
BY R.H. Wendt
Attorney.

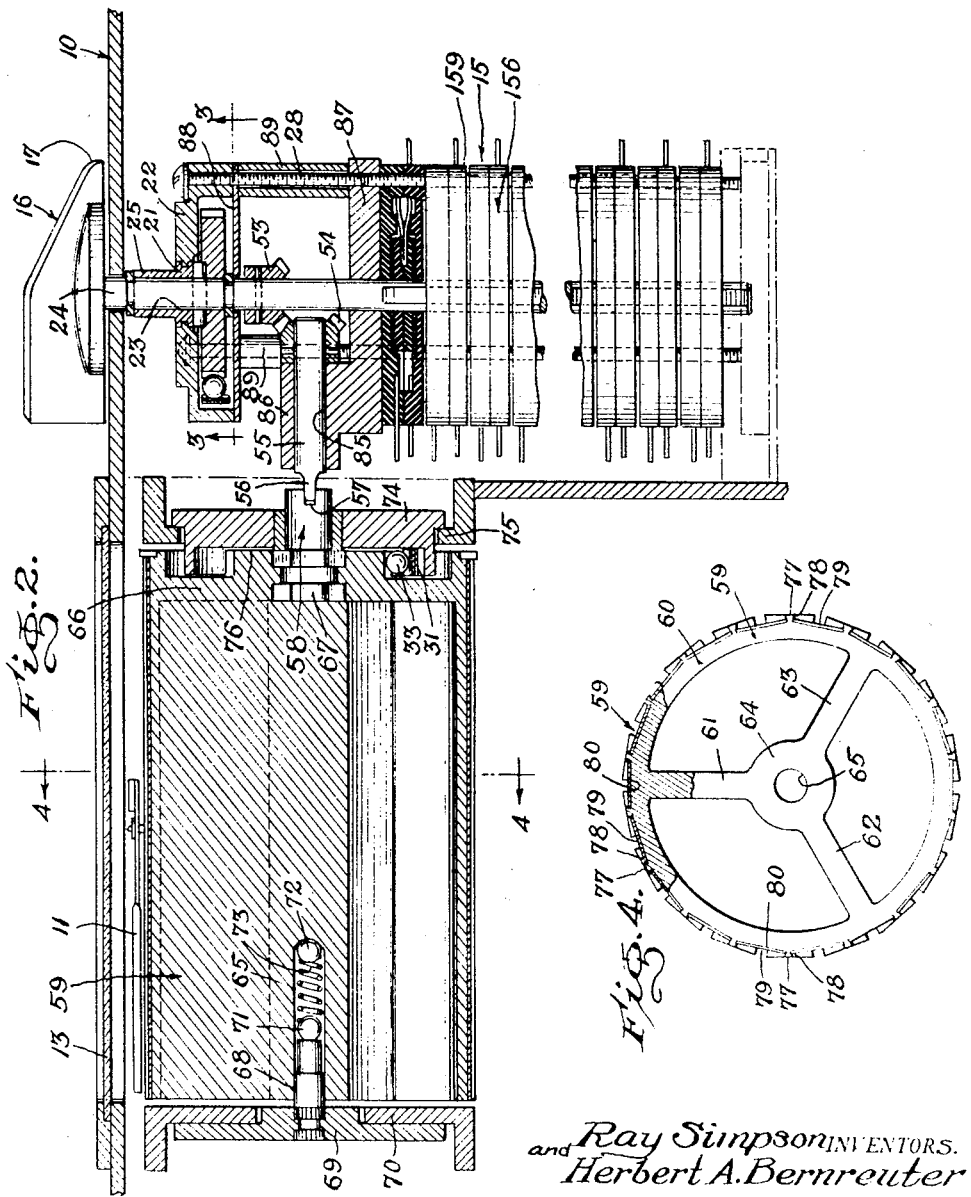

Patented June 26, 1951

2,558,276

UNITED STATES PATENT OFFICE 2,558,276

MULTIPLE SCALES FOR ELECTRICAL MEASURING INSTRUMENTS

Ray Simpson and Herbert A. Bernreuter, Chicago, Ill., assignors, by mesne assignments, to American Gage & Machine Company, Chicago, Ill., a corporation of Illinois Application May 29, 1948, Serial No. 30,116

2 Claims. (Cl. 171—95)

The present invention relates to electrical measuring instruments with multiple scales, and is particularly concerned with improvements in the type of electrical instrument shown in the prior patent to Ray Simpson and George H. Koch, No. 2,101,296, issued December 7, 1937.

One of the objects of the invention is the provision of an improved electrical measuring instrument assembly including a meter movement, a drum with a plurality of different scales, and a rotary switch for connecting in circuit appropriate multipliers, resistors, etc. for use with the movement, as required for the particular scale then being used, all of this mechanism being controlled by a single switch knob.

Another object of the invention is the provision of an improved construction for a multiple scale meter of the class described, in which provision is made to avoid the effects of back lash at the scale supporting member, so that both the switch and the scale supporting member may be brought into accurate registry with the corresponding contact and scale, respectively on every occasion.

Another object of the invention is the provision of an improved multiple scale meter in which the drum, which supports the multiple scales, is provided with means for constantly urging the drum axially in one direction to take up any play and keep the scales all located in the proper zero position.

Another object of the invention is the provision of an improved multiple scale supporting drum which may be manufactured more cheaply, and which may be provided with its scale indicia more readily, and from which the different supports for the scales may be readily removed, to change the scales with a minimum amount of labor.

Another object is the provision of an improved multiple scale meter of the class described which is sturdy, accurate, adapted to be manufactured cheaply, and adapted to be used for a long period of time without repair or replacement of any of its parts.

Other objects and advantages of the invention will be apparent from the following description and the accompanying drawings, in which similar characters of reference indicate similar parts throughout the several views.

Referring to the drawings accompanying this specification, of which there are two sheets, Fig. 1 is a fragmentary top plan view of the face of a panel, showing one of the multiple scales exposed to view at a window and showing the switch knob in the corresponding switch position;

Fig. 2 is a sectional view, taken through the mechanism of such a multiple scale meter, on a plane passing through the axis of the switch shaft and through the axis of the scale supporting drum;

Fig. 3 is a sectional view, taken on the plane of the line 3—3 of Fig. 2, looking in the direction of the arrows, showing the details of construction of the indexer;

Fig. 4 is a sectional view, taken on the plane of the line 4—4 of Fig. 2, showing the details of construction of the scale supporting drum.

Referring to Fig. 1, 10 indicates the panel of a housing containing an electrical instrument movement, which may be carried by the panel, and which is provided with a pointer 11 behind the panel. The panel is provided with an elongated rectangular window opening 12, preferably closed by means of a pane of glass 13, which may be secured to the rear of the panel, and which exposes to view one of a plurality of rectangular dials bearing scale divisions and indicia 14 to co-operate with the pointer 11.

The panel 10 also supports an electric switch, indicated in its entirety by the numeral 15 (Fig. 2) and adapted to be actuated by a switch knob 16. The switch knob 16 comprises a molded member, which is beveled to provide a pointed end 17, and which also preferably has a strip of sheet metal 18 embedded in the top of the knob 16 to act as the pointer for registry with the indicia 19, which appear upon the panel 10 about the rotary switch knob 16.

The indicia 19 are inscribed upon the panel in connection with rotary scale divisions 20, and indicate the proper position of the switch for the corresponding dial or scale that appears at the window opening 12. For example, if the 2.5 volt scale is desired, the switch knob 16 is turned to 2.5 (Fig. 1) and the switch, which is controlled by the knob thereupon, connects suitable voltage multipliers or dividers or resistors in circuit with the electric meter movement, so that the meter is calibrated for 2.5 volts.

In a similar manner it will be noted that many different scales of voltage may be employed, or the meter may be employed to measure alternating current or direct current, or may be employed as an ammeter.

The electric switch 15 includes a bushing 21, which may pass through the panel 10 and be secured there by means of a nut 22. The bushing 21 has a bore 23 serving as a bearing for the switch shaft 24, which is provided with split rings 25, 26 on each end of the bushing 21 to prevent endwise movement of the shaft 24, which is provided with an extension 27, having a flat side, so that it may be used to drive rotary switch members. Any number of switch units may be mounted on the same shaft 24, depending on the number of different switch positions and different connections desired; and the separate switch units are indicated by the numerals 15a, 15b, etc.

The bushing 21 has its lower end embedded or molded in a rectangular member 28, the structure of which is better shown in Fig. 3. This rectangular member is formed with a partially circular recess 29, which has segmental portions provided with slots 30 for receiving bowed leaf springs 31.

The slots 30 communicate with the radial slots 32, which receive the index balls 33 that are engaged by the springs 31 and forced into engagement with the index rotor 34. The index rotor 34 comprises a disc of molded insulating material having a central cylindrical aperture provided with a flat side 40 fitting on the flat sided shaft portion 27; and the disc 39 has its periphery provided with partially cylindrical grooves 41 separated by rounded humps 42.

Each such groove is adapted to receive one of the index balls 33 when the disc is rotated to the proper position for registry between the ball and a particular groove. The indexer 28 is preferably provided with three such spring pressed balls 33 equally spaced about the shaft. Since the spring pressure is counterbalanced there is no lateral load on the shaft 27.

When the knob is turned, the curved grooves 41 cam the balls 33 backward against the springs 31, and the disc is permitted to rotate until the balls drop into the next groove 41. This holds the switch in any one of a multiplicity of different but definite positions, and also gives the switch a snap action because after the ball passes a hump 42, its springs press it into the next groove 41 and tend to urge the disc along in its rotation with a snap action.

Each switch unit includes a pair of similar cup-shaped housing members 43, 44; and all of the members 28, 43 and 44 are secured together by screw bolts passing through the apertures 45. Each cup-shaped member 43 has embedded therein one or more electric contacts 46, the contacts projecting radially into a circular chamber 47. Thus the opposed cup-shaped member 44 also has contacts 48 embedded therein and exposed in the chamber 47.

The shaft portion 27 passes through round holes in the cup-shaped members 43, 44, which merely serve as further bearing surfaces; but the rotor 49 of each switch unit comprises a pair of discs that fit in the recess 47 and are themselves provided with recesses for receiving the anchoring formation 50 of a pair of movable contacts 51, 52, which are fixedly and electrically secured together on the rotor 49.

The contacts 51, 52 establish connection between contacts 46 and 48, for example, when the switch is in the position of Fig. 2. The rotor 49 rotates with the shaft portion 27 because rotor 49 has a circular aperture with a flat side complementary to the shaft. Thus the rotary switch 15 includes a multiplicity of switch units, all controlled by the same shaft 16 and by the indexer 28, to move with a snap action from one contact to another, and to be held firmly in any position to which it is moved.

The shaft 24 is provided with a bevel gear 53 engaging the bevel gear 54 on another shaft 55, which extends at right angles to the switch shaft 24. The shaft 55 has a narrow flattened end portion 56, which fits in the narrow slot 57 in the shaft 58, on which the scale drum is mounted. Thus the turning of the rotary switch also serves to turn the shaft that supports the scale drum, and brings into proper position the proper scale on the drum.

The scale supporting drum comprises a molded insulating member 59, which may be made of a phenolic condensation product, and which preferably includes an outer cylindrical wall 60, a plurality of radial flanges 61, 62, 63, and a hub 64 having an aperture 65.

The right end of the drum 59 is closed by means of a wall 66, in which there may be embedded the anchoring formations 67 of a stub shaft 58. The radial flanges 61—63 taper in thickness toward the left or open end, for the convenient removal of cores; and the aperture 65 in the hub 64 is adapted to receive a trunnion 68 carried by the end wall 69 and embedded therein.

The end wall 69 is carried by a supporting flange 70, which depends from the panel; and the aperture 65 also receives a pair of ball bearings 71 and 72, separated by a compression spring 73. The compression spring 73 constantly urges the drum 59 toward the right against the indexer 74, which is carried by a depending supporting flange 75.

Referring to Figure 1, it will be noted that the zero reading is at the left end of every scale, and the spring 73 constantly urges the scale supporting drum 59 toward the right so that all of the scales will have their zero readings located in the same circle at all times. A single adjustment of the needle to zero position on one scale will result in its adjustment to all of the other scales.

The indexer 74 is similar in construction to the indexer shown in Figure 3, except that the drum 59 integrally supports on its end wall 66 the indexer disc 76, the periphery of which is shaped like the indexer 39 of Figure 3.

The indexer body 74 corresponds in construction to the member 28, Figure 3, being provided with the same balls and springs 33, 31 for holding the drum 59 in such position that its various scales register with the window, irrespective of any looseness or back lash between the switch and the drum.

The indexer 74 is fixedly supported upon the part 75 which depends from the panel 10. The rotary switch may in all of its details correspond substantially to the switch shown in the prior application of Ray Simpson, Serial No. 705,623, filed October 25, 1946, for Rotary Switches, Patent No. 2,447,718, issued on August 17, 1948.

The drum 59 has its periphery formed with a plurality of radially extending ribs 77, the walls of which are undercut at 78 on each side so as to retain the cardboard dial members 79, which are rectangular in shape and of the proper size to slide in endwise between the ribs 77.

The dial members bear the members of the various scales, and they rest against the flat surfaces 80 on the drum 59 between the ribs 77, where they are retained by the undercut portions 78.

The operation of the present meter is as follows: When it is desired to use a particular scale its range is indicated by the indicia surrounding the switch knob 16, and the knob must be turned to the corresponding position. This automatically connects in circuit by means of the rotary switch 15, the proper multipliers, resistances, shunts, etc., which are to be used with the meter movement for that range and scale.

The proper terminals, as indicated on the panel, are then employed and reading made as usual. As the knob 16 turns, the switch shaft also turns the drum 59 through the universal connection 56, 57. In such an arrangement there is necessarily some lost motion or back lash, which might result in the switch reaching the proper position with the scale not in proper registry with the window. This, however, is eliminated by providing both the switch and the drum with an indexer which causes both the switch and the drum to snap into a predetermined position each time the knob is actuated, and the indexers hold both the switch and drum in the desired position.

It will thus be observed that we have invented an improved multiple scale meter in which the scales are held in definite position by an indexer at the same time the switch contacts that control the various meter arrangements are held in proper position.

As the scale supporting drum has a definite position for each scale and carries an integral indexer disc, there is no possibility of the scales being out of registry with the window as long as any one scale is so adjusted as to register with the window.

Since the scale supporting drum is resiliently urged toward the right against a thrust bearing, this also keeps all of the zero positions of the scales in alignment with each other so that a single zero adjustment adjusts the pointer to all scales.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States is:

1. In a multiple dial, multiple circuit electrical instrument, a dial supporting drum assembly comprising a supporting panel provided with an elongated rectangular window and a pair of depending bearing members, each of said bearing members rotatably supporting a stub shaft, a dial supporting drum comprising a molded insulating member of substantially cylindrical shape having a central hub joined to an outer cylindrical shell by a plurality of radial plates forming spokes, said member being formed on its periphery with a multiplicity of flat scale supporting surfaces of substantially rectangular shape bordered on each of their long edges by outwardly projecting under-cut integral flanges, said member also having a radial stop flange at the ends of all of said flat surfaces, a plurality of scale division cards slidably inserted from one end of said member below said under-cut flanges to be carried by said member, said member having an axially extending bore in one end for one stub shaft, and a compression spring in said bore and engaging a metal ball at each of its ends, one of said balls reacting against said stub shaft to drive said member axially toward the opposite direction so that all of said scale division cards have their zero positions constantly located in the same plane transversely to the axis of said member.

2. In a multiple dial, multiple circuit electrical instrument, a dial supporting drum assembly comprising a supporting panel provided with an elongated rectangular window and a pair of depending bearing members, each of said bearing members rotatably supporting a stub shaft, a dial supporting drum comprising a molded insulating member of substantially cylindrical shape having a central hub joined to an outer cylindrical shell by a plurality of radial plates forming spokes, said member being formed on its periphery with a multiplicity of flat scale supporting surfaces of substantially rectangular shape bordered on each of their long edges by outwardly projecting under-cut integral flanges, said member also having a radial stop flange at the ends of all of said flat surfaces, a plurality of scale division cards slidably inserted from one end of said member below said under-cut flanges to be carried by said member, said member having an axially extending bore in one end for one stub shaft, and a compression spring in said bore and engaging a metal ball at each of its ends, one of said balls reacting against said stub shaft to drive said member axially toward the opposite direction so that all of said scale division cards have their zero positions constantly located in the same plane transversely to the axis of said member, the other of said stub shafts being provided with a molded indexer having a plurality of radially inwardly pressed balls for engaging a grooved hub carried by said member so that the scale supporting member is constantly held with one of its scales in registry with said window and so that it may be moved step by step to cause any of the other scales to register with the window.

RAY SIMPSON.
HERBERT A. BERNREUTER.

REFERENCES CITED

The following references are of record in the file of this patent:

UNITED STATES PATENTS

| Number | Name | Date |
| --- | --- | --- |
| 2,101,296 | Simpson et al. | Dec. 7, 1937 |
| 2,154,066 | De Giers | Apr. 11, 1939 |
| 2,454,042 | Dettinger | Nov. 16, 1948 |
| 2,466,558 | Sadlon | Apr. 5, 1949 |

FOREIGN PATENTS

| Number | Country | Date |
| --- | --- | --- |
| 409,784 | Great Britain | May 10, 1934 |